(12) United States Patent
Rusignuolo et al.

(10) Patent No.: US 10,018,399 B2
(45) Date of Patent: Jul. 10, 2018

(54) TRANSPORT REFRIGERATION SYSTEM HAVING ELECTRIC FANS

(71) Applicant: Carrier Corporation, Farmington, CT (US)

(72) Inventors: Giorgio Rusignuolo, Manlius, NY (US); Robert A. Chopko, Baldwinsville, NY (US)

(73) Assignee: CARRIER CORPORATION, Jupiter, FL (US)

( * ) Notice: Subject to any disclaimer, the term of this patent is extended or adjusted under 35 U.S.C. 154(b) by 186 days.

(21) Appl. No.: 14/398,175

(22) PCT Filed: Feb. 26, 2013

(86) PCT No.: PCT/US2013/027743
§ 371 (c)(1),
(2) Date: Oct. 31, 2014

(87) PCT Pub. No.: WO2013/165534
PCT Pub. Date: Nov. 7, 2013

(65) Prior Publication Data
US 2015/0121923 A1    May 7, 2015

Related U.S. Application Data

(60) Provisional application No. 61/640,919, filed on May 1, 2012.

(51) Int. Cl.
*F25D 17/06* (2006.01)
*F25B 1/10* (2006.01)
(Continued)

(52) U.S. Cl.
CPC ....... *F25D 17/067* (2013.01); *B60H 1/00428* (2013.01); *B60H 1/00828* (2013.01);
(Continued)

(58) Field of Classification Search
CPC .......... B60H 1/00428; B60H 1/00364; B60H 1/00828; F25D 17/067; F25D 11/003; F25B 49/022; F25B 1/10; F25B 2600/02
(Continued)

(56) References Cited

U.S. PATENT DOCUMENTS 4,723,107 A * 2/1988 Schmid .................... F15B 21/14
                                                    318/139
4,934,158 A * 6/1990 Sakano ................ B60H 1/3222
                                                    62/196.2
(Continued)

FOREIGN PATENT DOCUMENTS

EP   0355946 A2 *  2/1990 ........... B60H 1/3222
EP   1790921 A1 *  5/2007 ......... B60H 1/00014
WO   2008094148 A1  8/2008

OTHER PUBLICATIONS

Notification of Transmittal of the International Search Report and the Written Opinion of the International Searching Authority, or the Declaration; PCT/US2013/027743; dated May 6, 2013.

*Primary Examiner* — Ljiljana Ciric
*Assistant Examiner* — Kirstin Oswald
(74) *Attorney, Agent, or Firm* — Cantor Colburn LLP

(57) ABSTRACT

A transport refrigeration system having one or more compressors forming part of a refrigeration circuit for cooling an interior compartment of a container or refrigerated trailer; and one or more fans powered by direct current (DC) power, the one or more fans being at least one of an evaporator fan, a condenser fan and a ventilation fan.

12 Claims, 4 Drawing Sheets

(51) Int. Cl.
  *F25D 11/00* (2006.01)
  *F25B 49/02* (2006.01)
  *B60H 1/00* (2006.01)
  *B60H 1/32* (2006.01)

(52) U.S. Cl.
  CPC ............ *B60H 1/3232* (2013.01); *F25B 1/10* (2013.01); *F25B 49/022* (2013.01); *F25D 11/003* (2013.01); *F25B 2600/02* (2013.01); *Y02T 10/88* (2013.01)

(58) Field of Classification Search
  USPC .................................. 62/243, 126, 426, 428
  See application file for complete search history.

(56) References Cited

U.S. PATENT DOCUMENTS

| | | | | |
|---|---|---|---|---|
| 5,198,698 | A * | 3/1993 | Paul | H02J 9/08 307/46 |
| 5,333,678 | A * | 8/1994 | Mellum | B60H 1/00378 122/26 |
| 5,513,718 | A * | 5/1996 | Suzuki | B60K 6/485 180/65.26 |
| 6,202,782 | B1 * | 3/2001 | Hatanaka | B60K 3/04 180/301 |
| 6,456,508 | B1 * | 9/2002 | Namai | H02J 9/062 318/116 |
| 7,150,159 | B1 * | 12/2006 | Brummett | B60H 1/00378 62/236 |
| 2004/0016246 | A1 * | 1/2004 | Furukawa | B60H 1/00828 62/183 |
| 2004/0168455 | A1 * | 9/2004 | Nakamura | B60H 1/004 62/244 |
| 2004/0221596 | A1 | 11/2004 | Hille et al. | |
| 2005/0035657 | A1 * | 2/2005 | Brummett | B60H 1/3226 307/10.1 |
| 2005/0035667 | A1 * | 2/2005 | Joannou | H01H 1/20 307/125 |
| 2005/0044873 | A1 * | 3/2005 | Tamai | B60H 1/004 62/323.1 |
| 2006/0125317 | A1 * | 6/2006 | Kokubo | B60K 6/445 303/152 |
| 2007/0130950 | A1 * | 6/2007 | Serkh | F02B 63/04 60/698 |
| 2007/0221370 | A1 * | 9/2007 | Allen | B60H 1/00428 165/202 |
| 2008/0067962 | A1 | 3/2008 | Mazaika | |
| 2008/0104971 | A1 | 5/2008 | Sami | |
| 2008/0110683 | A1 * | 5/2008 | Serkh | B60K 25/00 180/54.1 |
| 2008/0174174 | A1 * | 7/2008 | Burns | B60W 10/08 303/152 |
| 2009/0229288 | A1 * | 9/2009 | Alston | B60H 1/00428 62/236 |
| 2010/0039054 | A1 * | 2/2010 | Young | B60K 6/46 318/376 |
| 2010/0050671 | A1 * | 3/2010 | Kahn | B60H 1/00378 62/190 |
| 2010/0154449 | A1 | 6/2010 | Stoverm, Jr. et al. | |
| 2010/0263703 | A1 | 10/2010 | Reichart et al. | |

* cited by examiner

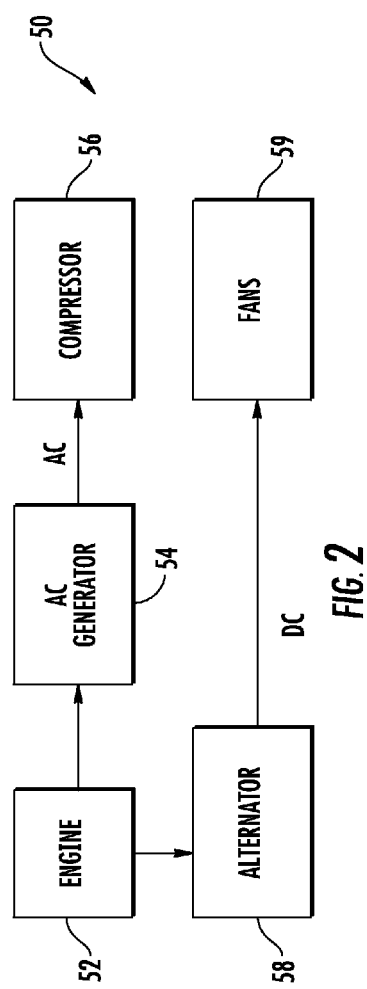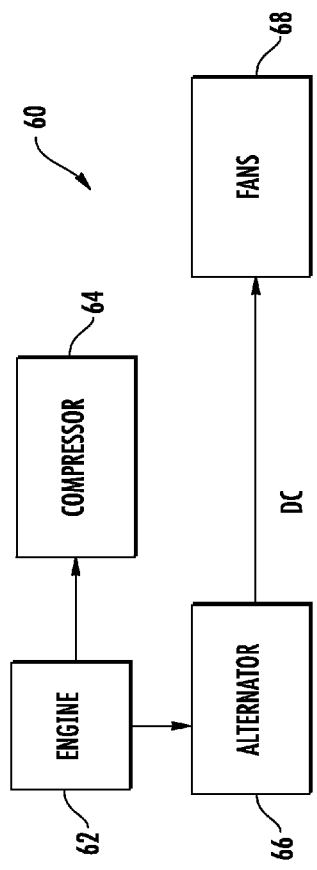

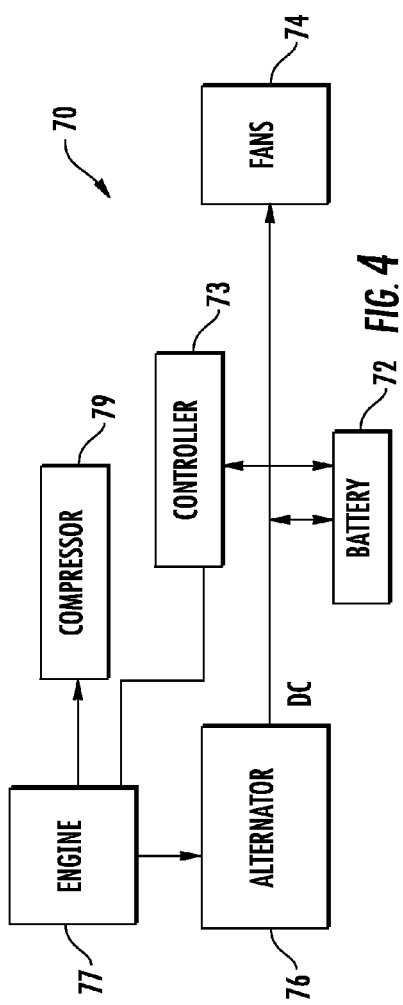
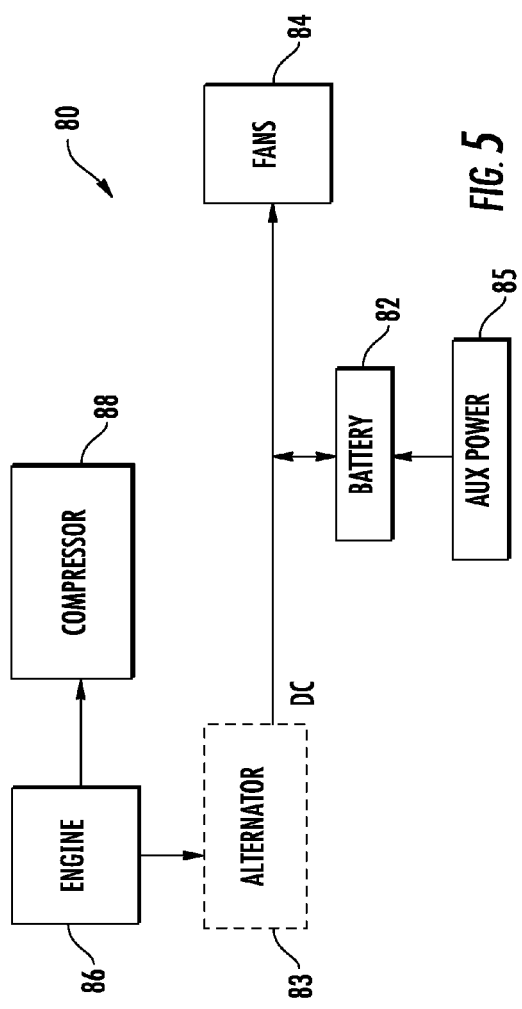

TRANSPORT REFRIGERATION SYSTEM HAVING ELECTRIC FANS

BACKGROUND OF THE INVENTION

The subject matter disclosed herein generally relates to transport refrigeration systems and, in particular, relates to a transport refrigeration system having one or more electrically powered fans.

Transport refrigeration systems typically include a refrigeration system. The refrigeration system includes a compressor, condenser, expansion device and one or more evaporators. The refrigeration system also includes one or more fans, such as a condenser fan, evaporator fan and ventilation fan. Traditional systems power one or more of the fans using mechanical transmission (e.g., belts). Some traditional systems use AC powered fans.

BRIEF DESCRIPTION OF THE INVENTION

One exemplary embodiment is a transport refrigeration system having one or more compressors forming part of a refrigeration circuit for cooling an interior compartment of a container or refrigerated trailer; and one or more fans powered by direct current (DC) power, the one or more fans being at least one of an evaporator fan, a condenser fan and a ventilation fan.

BRIEF DESCRIPTION OF THE DRAWINGS

FIG. 2 depicts a transport refrigeration power system in an exemplary embodiment.

FIG. 3 depicts a transport refrigeration power system in another exemplary embodiment.

FIG. 4 depicts a transport refrigeration power system in another exemplary embodiment.

FIG. 5 depicts a transport refrigeration power system in another exemplary embodiment.

DETAILED DESCRIPTION OF THE INVENTION

Figure 1:
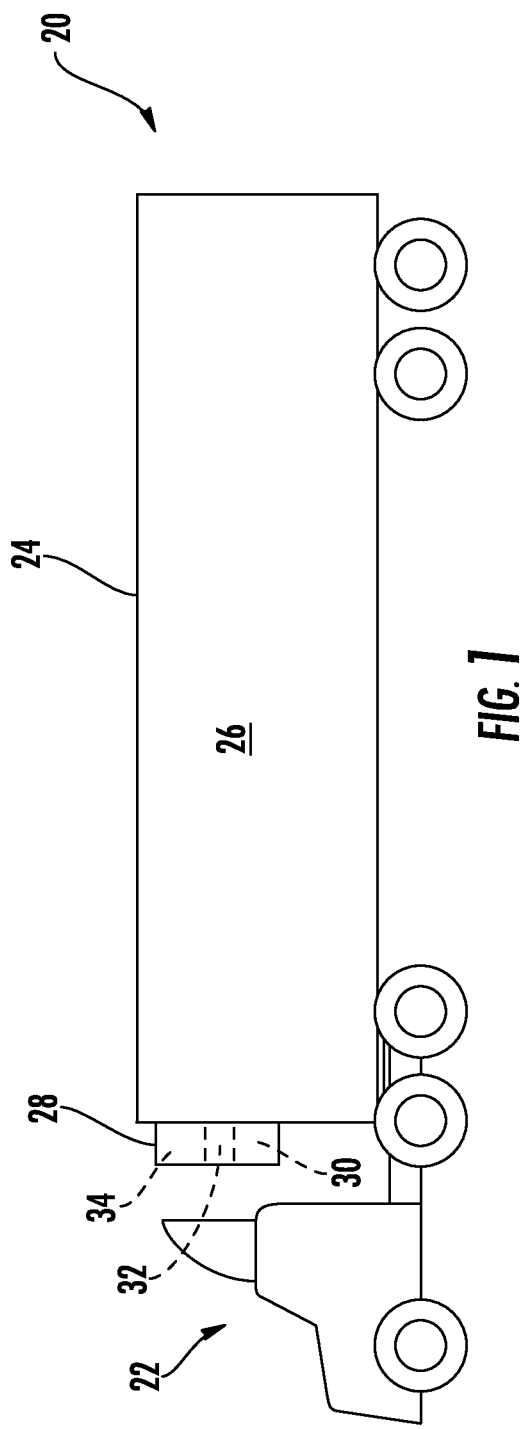
FIG. 1 depicts a transport refrigeration system in an exemplary embodiment.

FIG. 1 shows a transport refrigeration system 20 having a refrigerated trailer. The trailer may be pulled by a tractor 22. The exemplary trailer includes a container 24 defining an interior compartment 26. It is understood that embodiments described herein may be applied to shipping containers that are shipped by rail or sea, without use of a tractor 22. An equipment housing 28 mounted to a front of the container 24 may contain an electric generator system including an internal combustion engine 30 (e.g., compression ignition/diesel) and an electric generator 32 mechanically coupled to the engine 30 to be driven thereby. A refrigeration system 34 may be electrically coupled to the generator 32 to receive electrical power. Refrigeration system 34 includes a compressor, condenser, expansion valve and one or more evaporators defining a refrigeration circuit for circulating a refrigerant, as known in the art. Refrigeration system 34 also includes one or more fans, such as a condenser fan, evaporator fan or ventilation fan. Embodiments of the invention described herein power one or more fans (such as a condenser fan, evaporator fan and/or ventilation fan) using direct current (DC).

FIG. 2 depicts transport refrigeration power system 50 in an exemplary embodiment. It is understood that many components of the transport refrigeration system are not shown for ease of illustration. The transport refrigeration power system 50 includes an engine 52 (e.g., compression ignition/diesel) mechanically coupled to a high voltage AC generator 54. Generator 54 provides AC power to compressor 56 to drive a compressor motor (e.g., a hermetic compressor, or a motor separated from the compressor via shaft). An alternator 58 is mechanically coupled to engine 52 and provides DC power to one or more low or high voltage DC fans 59. In this case, the AC generator 54 provides AC power to the compressor 56, but at least one of the evaporator fan motor, condenser fan motor and ventilation fan motor is driven with DC power from DC alternator 58 which driven by the engine 52.

FIG. 3 depicts transport refrigeration power system 60 in an exemplary embodiment. The transport refrigeration power system 60 is similar to that shown in FIG. 2, but compressor 64 is open drive and powered directly by the engine 62. Engine 62 directly drives compressor 64 through a mechanical coupling (e.g., a crankshaft, belt drive, or chain drive) and no high voltage AC generator is needed. An alternator 66 is mechanically coupled to engine 62 and provides DC power to one or more low or high voltage DC fans 68. At least one of an evaporator fan motor, condenser fan motor and ventilation fan motor is driven with DC power from DC alternator 66 which is driven by the engine 62.

FIG. 4 depicts transport refrigeration power system 70 in an exemplary embodiment. The transport refrigeration power system 70 is similar to that shown in FIG. 3, but also includes a battery 72 to provide DC power to at least one fan 74 (e.g., condenser fan, evaporator fan, ventilation fan). Engine 77 directly drives compressor 79 via a mechanical coupling. Alternatively, an AC generator may be utilized to power compressor 79 as described with reference to FIG. 2. In FIG. 4, the alternator 76 that is driven directly by the engine 77 charges the battery 72, which in turn provides power to at least one DC fan 74 motor (e.g., condenser fan motor, evaporator fan motor, ventilation fan motor). This allows for the transport refrigeration power system 70 to stop engine 77 when the cargo reaches its predetermined temperature and run one or more fan motors on battery power, providing air circulation throughout the cargo.

The system of FIG. 4 may also include a controller 73 that monitors battery 72 voltage or charge. During start-stop modes, when compressor 79 is off, one or more fans 74 are kept on to maintain adequate flow and temperature uniformity in the trailer. If controller 73 detects that the voltage at battery 72 has dropped below a threshold, controller 73 sends a command signal to engine 77 to start engine 77. This results in alternator 76 charging battery 72 to an acceptable voltage. Controller 73 can then command the engine 77 to stop once the desired battery voltage is reached.

FIG. 5 depicts transport refrigeration power system 80 in an exemplary embodiment. The transport refrigeration power system 80 is similar to that shown in FIG. 4, and includes a battery 82 to provide DC power to at least one fan 84 (e.g., condenser fan, evaporator fan, ventilation fan). Engine 86 directly drives compressor 88 via a mechanical coupling. Alternatively, an AC generator may be utilized to power compressor 88 as described with reference to FIG. 2. Alternator 83 is optional and battery 82 receives DC power from one or more auxiliary power sources 85. The auxiliary power source 85 may be a source of DC power produced at the trailer. For example, auxiliary power source 85 may be implemented through solar panels and/or wind turbines on the roof of the trailer. Auxiliary power source 85 may also convert kinetic energy of the trailer into DC power. Exemplary sources of DC power include axle mounted generators on rear axles of the trailer, regenerative brakes on the trailer or other DC power sources that convert trailer kinetic energy to DC power. If alternator 83 is employed in FIG. 5, a controller such as that in FIG. 4 may be used to control engine 86 to charge battery 82 as described above with reference to FIG. 4.

Figure 6:
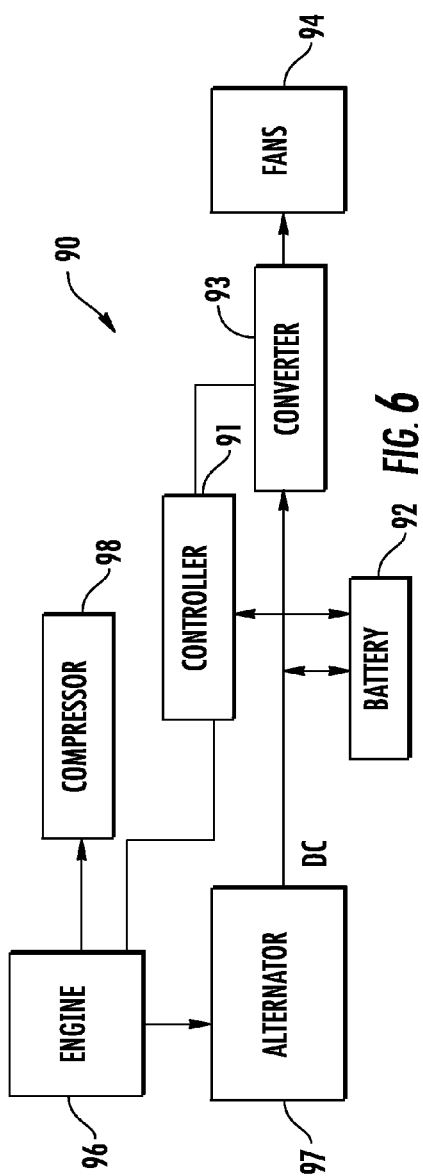
FIG. 6 depicts a transport refrigeration power system in another exemplary embodiment.

FIG. 6 depicts transport refrigeration power system 90 in an exemplary embodiment. The transport refrigeration power system 90 is similar to that shown in FIG. 4, and includes a battery 92 to provide DC power to at least one fan 94 (e.g., condenser fan, evaporator fan, ventilation fan). In FIG. 6, alternator 97 that is driven directly by the engine 96 charges the battery 92, which in turn provides power to at least one DC fan 94 motor (e.g., condenser fan motor, evaporator fan motor, ventilation fan motor). Engine 96 directly drives compressor 98 via a mechanical coupling. Alternatively, an AC generator may be utilized to power compressor 98 as described with reference to FIG. 2.

The system of FIG. 6 includes a controller 91 that controls a DC to DC converter 93. Depending on the mode of operation, the DC voltage applied to fans 94 (e.g., one or more of condenser fan, evaporator fan, ventilation fan) is modified by the converter 93, in response to command signals from controller 91. This allows the fan speed to be adjusted in accordance with the operational mode of the compressor 98 and demands of the refrigeration system. For example, in scenarios where the compressor is off, controller 91 can reduce voltage to one or more fan 94 through converter 93, as the airflow demand may be reduced in this mode. This reduces power consumed by fans 94, and leads to reduced operation of engine 96 and thus, lower fuel consumption. As described above with reference to FIG. 4, controller 91 may also monitor voltage at battery 92, and start engine 96 to charge battery 92 through alternator 97.

Figure 7:
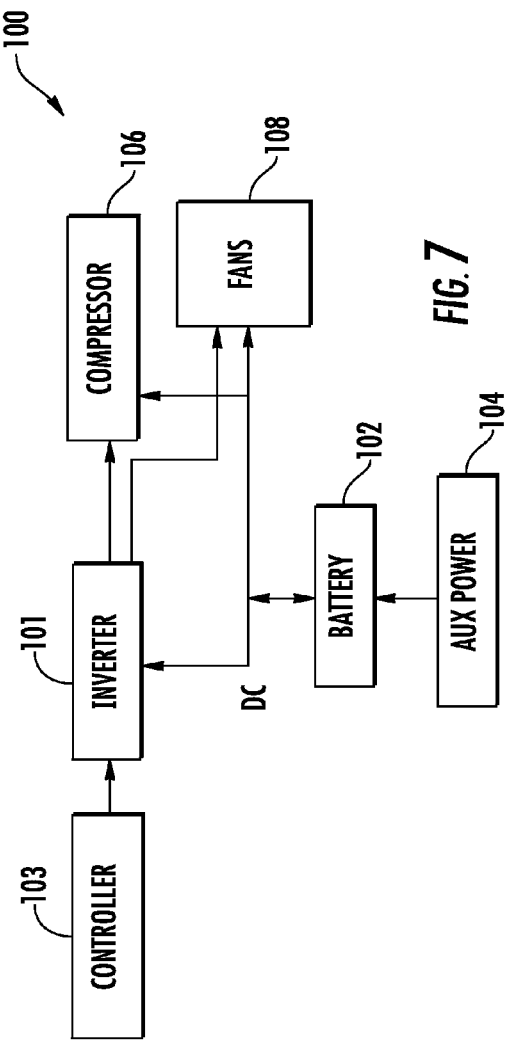
FIG. 7 depicts a transport refrigeration power system in another exemplary embodiment.

FIG. 7 depicts transport refrigeration power system 100 in an exemplary embodiment. In this embodiment, the engine and alternator are removed. Battery 102 includes one or more batteries having a high, total storage capacity (e.g., about 5 kWh or greater). Battery 102 is charged from auxiliary sources 104, as described above with reference to FIG. 5. Battery 102 powers compressor 106 and fans 108. If the compressor 106 and/or one or more fans 108 are AC powered, then an inverter 101 is used to convert DC power to AC power and provide AC power to the compressor 106 and/or fans 108. In this embodiment, all of the electric motors can be DC, AC or a combination of both. The inverter 101 may also be used to adjust the speed of the compressor motor and/or fans motor, to reduce noise and/or improve total system fuel economy.

Controller 103 provides command signals to inverter 101 to provide a suitable AC power to the compressor 106 and/or fans 108, depending on the mode of operation. For example, in high-cooling mode, inverter 101 may provide a maximum AC power to compressor 106 and fans 108. In an idle mode, with compressor 106 off, inverter 101 will provide reduced AC power to fans 108. The converter 93 of FIG. 6 may also be used in the system of FIG. 7 to control DC power to the compressor 106 and fans 108 if these components are DC powered.

It is understood that components from one embodiment may be used in other embodiments without departing from the scope of the invention. Embodiments may employ low voltage DC fans, powered via a battery/alternator (recharged by the engine) or via a large battery coupled to auxiliary energy source(s) available in the trailer. DC fans provide several advantages such as lower cost, fan speed control at lower complexity/cost and the ability to run the fans when the engine off.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A transport refrigeration system comprising:
   one or more compressors forming part of a refrigeration circuit configured to cool an interior compartment of a container or refrigerated trailer;
   one or more fans configured to be powered by direct current (DC) power, the one or more fans being at least one of an evaporator fan, a condenser fan and a ventilation fan;
   a battery, the battery configured to provide DC power to the one or more fans;
   an auxiliary power source, the auxiliary power source configured to provide DC power to charge the battery, the auxiliary power source selected from the group consisting of an axle mounted generator and a regenerative brake mounted to the container or refrigerated trailer.

2. The transport refrigeration system of claim 1 further comprising:
   an engine; and
   an alternator operably coupled to the engine, the alternator configured to provide the DC power to the one or more fans.

3. The transport refrigeration system of claim 2 wherein:
   the engine directly drives the compressor through a mechanical coupling.

4. The transport refrigeration system of claim 2 further comprising:
   an AC or DC generator operably coupled to the engine;
   the AC or DC generator configured to provide AC or DC power to the compressor.

5. The transport refrigeration system of claim 1 further comprising:
   an engine; and
   an alternator operably coupled to the engine, the alternator configured to provide the DC power to the one or more fans and charge the battery.

6. The transport refrigeration system of claim 5 further comprising:
   a controller configured to monitor voltage at the battery, the controller configured to start the engine when the voltage at the battery drops below a threshold.

7. The transport refrigeration system of claim 1 further comprising: a DC to DC converter configured to adjust DC power from the battery and configured to provide adjusted DC power to the one or more fans.

8. The transport refrigeration system of claim 7 further comprising:
  an inverter configured to convert DC power from the battery to AC power;
  the inverter configured to provide AC power to the compressor.

9. The transport refrigeration system of claim 8 wherein:
the inverter is configured to provide AC power to the one or more fans.

10. A transport refrigeration system comprising:
  one or more compressors forming part of a refrigeration circuit configured to cool an interior compartment of a container or refrigerated trailer;
  one or more fans configured to be powered by direct current (DC) power, the one or more fans being at least one of an evaporator fan, a condenser fan and a ventilation fan;
  a battery, the battery configured to provide DC power to the one or more fans;
  an auxiliary power source, the auxiliary power source configured to provide DC power to charge the battery, the auxiliary power source selected from the group consisting of an axle mounted generator and a regenerative brake mounted to the container or refrigerated trailer:
    a DC to DC converter for configured to adjust DC power from the battery and configured to provide adjusted DC power to the one or more fans; and
    a controller coupled to the DC to DC converter, the controller configured to provide a command signal to the DC to DC converter to control power to the one or more fans in response to an operational mode of the compressor.

11. The transport refrigeration system of claim 10 wherein:
  the controller is configured to command the DC to DC converter to reduce DC power to the one or more fans when the compressor is off.

12. A transport refrigeration system comprising: one or more compressors forming part of a refrigeration circuit configured to cool an interior compartment of a container or refrigerated trailer;
  one or more fans configured to be powered by direct current (DC) power, the one or more fans being at least one of an evaporator fan, a condenser fan and a ventilation fan;
  a battery;
  an auxiliary power source, the auxiliary power source configured to provide DC power to charge the battery, the auxiliary power source selected from the group consisting of an axle mounted generator and a regenerative brake mounted to the container or refrigerated trailer;
  an engine;
  an alternator operably coupled to the engine, the alternator configured to charge the battery;
  an AC or DC generator operably coupled to the engine;
  the AC or DC generator configured to provide AC or DC power to the compressor;
  a controller configured to monitor voltage at the battery, the controller configured to start the engine when the voltage at the battery drops below a threshold;
  a DC to DC converter configured to adjust DC power from the battery and configured to provide adjusted DC power to the one or more fans;
  the controller coupled to the DC to DC converter, the controller configured to provide a command signal to the DC to DC converter in response to an operational mode of the compressor, wherein the controller is configured to command the DC to DC converter to reduce DC power to the one or more fans when the compressor is off.

* * * * *